United States Patent

Hellenbradt

[11] Patent Number: 6,123,202
[45] Date of Patent: Sep. 26, 2000

[54] METHOD OF AND DEVICE FOR HANDLING OF CUT LENGTHS AND SHORT LENGTHS IN MERCHANT BAR FINISHING LINES

[75] Inventor: Rainer Hellenbradt, Willich, Germany

[73] Assignee: SMS Schloemann-Siemag Aktiengesellschaft, Duesseldorf, Germany

[21] Appl. No.: 09/264,342

[22] Filed: Mar. 8, 1999

[30] Foreign Application Priority Data

Mar. 7, 1998 [DE] Germany .......................... 198 09 918

[51] Int. Cl.⁷ ...................................................... B07C 5/18
[52] U.S. Cl. ............................ 209/650; 209/918; 209/933
[58] Field of Search ..................................... 209/650, 656, 209/918, 933, 941

[56] References Cited

U.S. PATENT DOCUMENTS

| 2,198,285 | 4/1940 | Krenzer | 209/650 |
| 2,581,698 | 1/1952 | Oyston | 209/650 X |
| 4,161,251 | 7/1979 | Paul | 209/941 X |

FOREIGN PATENT DOCUMENTS 287606  3/1928  United Kingdom .................. 209/650

*Primary Examiner*—Tuan N. Nguyen
*Attorney, Agent, or Firm*—Brown & Wood, LLP

[57] ABSTRACT

A method of handling of cut lengths and short lengths to be transported to a collecting equipment and transportation equipment for bundling equipment and saw devices in merchant bar finishing lines, with the method including the steps of providing a common transporter for transporting the cut lengths and the short lengths to the collecting equipment and the transportation equipment; and device for effecting the method.

8 Claims, 1 Drawing Sheet

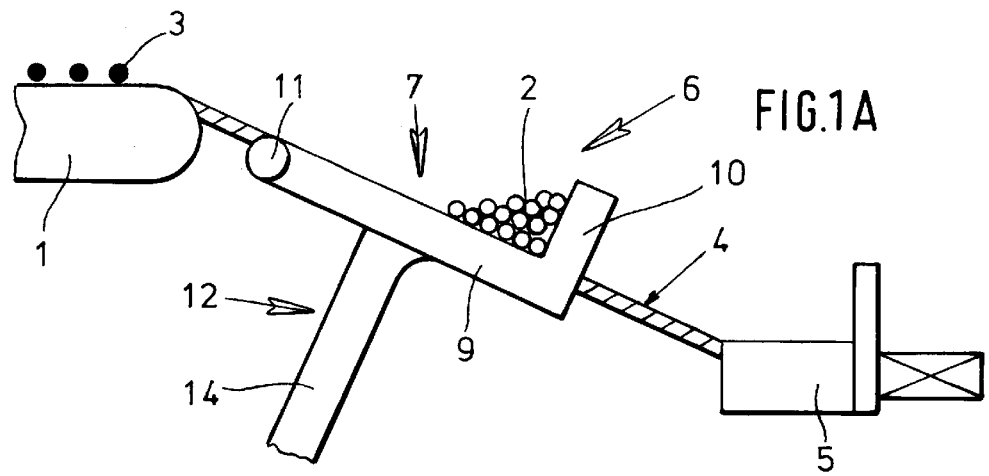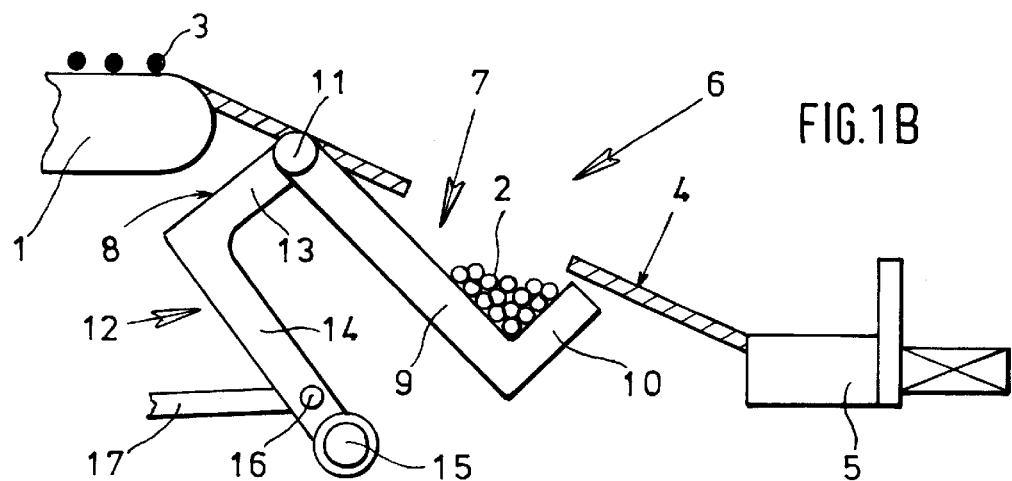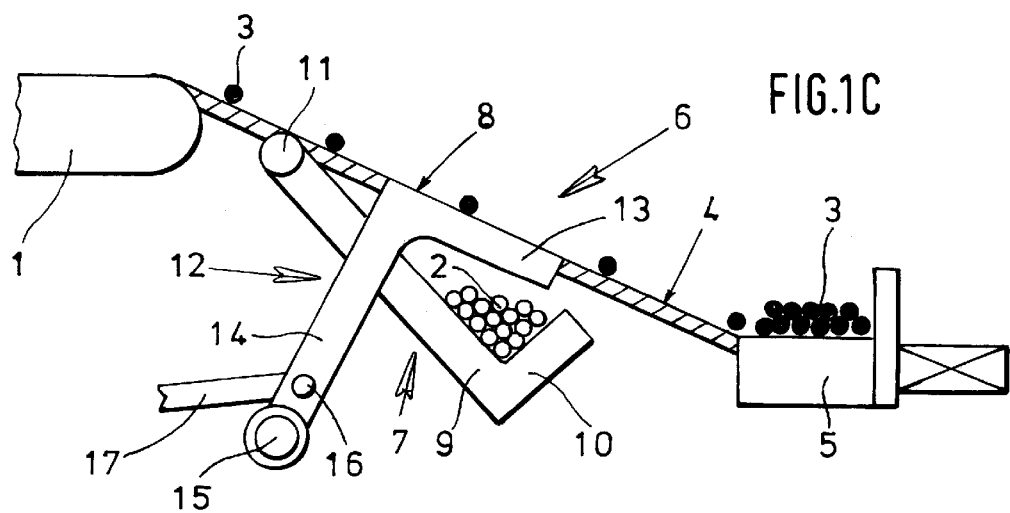

METHOD OF AND DEVICE FOR HANDLING OF CUT LENGTHS AND SHORT LENGTHS IN MERCHANT BAR FINISHING LINES

BACKGROUND OF THE INVENTION

1. Field of the Invention

The present invention relates to a method of and a device for handling of cut lengths and short lengths of, preferably, non-pliable rolled stock to be transported to collecting equipment and transportation equipment for bundling equipment and saw devices in merchant bar finishing lines.

2. Description of the Prior Art

A prospect (W3/308) of a firm Schloemann-Siemag AG, an assignee herein, describes a plant for a non-pliable rolled stock. Generally, this rolled stock is delivered to bundling and binding equipment by chain-type cross-conveyors. For determining the bundle weight, a bar counter is arranged within the cross-conveyor. The bars are bundled together, automatically bound with wire, weighed, labelled and transported for loading or to the finished good stores. For handling of short lengths, additional equipment and personnel are necessary. Automatic transportation, in a finishing line to bundling equipment and saw devices, is not possible, and, if possible, is connected with substantial expenses.

Accordingly, an object of the present invention is a method and a device which would insure the same handling of cut length and short length of non-pliable rolled stock.

SUMMARY OF THE INVENTION

This and other objects of the present invention, which will become apparent hereinafter, are achieved by providing a common transporter to both the collecting equipment and the transportation equipment. In this way, the same handling of both the cut lengths and the short lengths, i.e., automatic delivery to bundling equipment and saw devices in finishing lines is achieved, and additional manual labor and associated with it costs are eliminated.

Advantageously, according to the present invention, the device for handling cut lengths and short lengths, which are transported to collecting equipment and transportation equipment and saw devices in merchant bar finishing lines, is provided before the common transporter with a collecting trough or a collecting grate for the short lengths, and the collecting equipment for the cut lengths is arranged within the common transporter and is adapted to be lowered relative to the common transporter. When the collecting equipment is lowered, a free path is formed for automatic transportation of the short lengths, while the handling of the cut lengths is interrupted for a short time.

According to a further advantageous embodiment of the inventive device, the collecting equipment comprises an angular collecting lever pivotable downward against the transportation direction and having a long leg which is arranged, in the collecting position of the collecting lever, in the plane of the transporter, with the short leg projecting above the transporter. A predetermined number of the cut lengths is collected in the collecting lever before they are transported further. If a predetermined number of short lengths is collected in the collecting trough or grate earlier than the predetermined number of the cut lengths is collected in the collecting lever, the collecting lever is lowered beneath the common transporter, providing a free path for transporting the short lengths. Then, the collecting lever is pivoted back into its collecting position, and it can again be filled with the cut lengths.

Providing a swivel bearing at a free end of the long leg of the collecting lever insurers a particularly easy and substantially wearless lowering of the collecting lever because the swivel bearing can be easily lubricated and sheathed.

According to a further development of the present invention, on opposite sides of the collecting lever, there are provided pivotable slide guides which form, in the lowered position of the collecting lever, a transportation path within the transporter in a place, which is occupied by the collecting lever in its collecting position.

According to the present invention, the slide guides are formed by short legs of two angular levers arranged on the opposite sides of the collecting lever and long legs of which have, at free ends thereof, swivel bearings, the collecting means further comprising a connection element connecting the two angular levers.

In comparison with sidewise displaceable slide guides, the downward pivotable slide guides, analogous to the pivotable collecting lever, can be formed in a simple way and are very robust. Providing swivel bearings at the free ends of the long legs of the angular levers insures their easy and wear-free operation. The connection element insures a synchronous operation of the angular levers. For pivoting of the angular levers, hydraulic, pneumatic or electrical devices can be used. Because the slide guides are pivoted in a direction opposite to the transporting direction, they pivot out of the way of the lowered collecting lever and pivot to their bridging position in the transporter along the same path, providing for passing the short lengths through.

Advantageously, the movements of the collecting lever, collecting trough and angular levers are adapted to each other. By a precise sequence of movements of these elements, a rapid and trouble-free transportation of cut lengths and short lengths in the finishing line is insured.

BRIEF DESCRIPTION OF THE DRAWINGS

The features and objects of the present invention will become more apparent, and the invention itself will be the best understood from the following detailed description for the preferred embodiment when read with reference to the accompanying drawings, wherein:

FIG. 1a shows a schematic view of a collecting device with a collecting lever and slide guides in their initial or start positions;

FIG. 1b shows schematic view of the collecting device shown in FIG. 1a with the collecting lever and the slide guides in their lowered positions; and FIG. 1c show a schematic view of the collecting device shown in FIG. 1 with the collecting lever in its transitional positions and the slide guides being pivoted back into their initial position.

DETAILED DESCRIPTION OF THE PREFERRED EMBODIMENT

An installation shown in FIG. 1a includes a chain conveyor 1 for transporting cut lengths 2 and short lengths 3 from a cold shear, not shown, to a suitably arranged transporter 4. The transporter 4 leads to a roller table or a trough carrier (5) which transports the rolled stock to non-shown bundling equipment and saw devices.

A collecting device 6 for cut lengths is arranged within transporter 4. The collecting device 6 includes an angular collecting lever 7 and two slide guides 8. The collecting lever 7 has a long leg 9 and a short leg 10 extending perpendicular to each other. The long leg 9 has, at its free end, a swivel bearing 11 about which the collecting lever 7 pivots downward and, thus, in a direction opposite to the transporting direction. In the collecting position of the collecting lever 7, the long leg 9 lies in the plane of the transporter 4, and the short leg 10 projects above the long leg 9, as shown in FIG. 1a.

Slide guides 8 extend parallel to the opposite sides of the collecting lever 7. They form part of an angular levers 12 and are formed by the short legs 13 of the angular lever 12. The long legs 14 of the angular lever 12 extend perpendicular to short legs 13 and have, at their free ends, each a swivel bearing 15. The two angular lever 12 are connected by a connection element 16 which is connected with a hydraulic adjusting device 17. The collecting lever 7 is likewise pivoted by hydraulic means.

In FIG. 1b, both the collecting lever 7 and the angular levers 12 are shown in their lowered positions. In these positions, both levers 7 and 12 are beneath the transporter 4, and the transporter becomes free but is not closed.

FIG. 1c shows a free and closed transporter 4, with the collecting lever 7 in its lowered position and the angular lever 12 in its initial position which corresponds to a position providing for an unobstructed delivery along the transporter 4.

The inventive handling device operates as follows. In FIG. 1, the cut lengths are located in the collecting lever 7. Because their predetermined cut length number or coil weight has not yet been reached, the cut lengths 2 are not transported any further. On the other hand, short lengths 3 lie on the chain conveyor 1 in form of a layer or a bundle ready to be transported further. To provide for further transportation of short lengths 3, first, the angular lever 12 and then the collecting lever 7, together with the cut length 2 accumulated in the collecting lever 7, are lowered. Then the angular lever 12 is pivoted back forming a closed transportation path. As a result, the short cut layers or bundles can be transported to the roller table or the trough carrier 5. In this way, the complete output of the finishing line is delivered to the bundling equipment and saw means.

Finally, the angular lever 12 is lowered again and is lifted again, after the collecting lever 7 has been lifted. The cut lengths 2 continue to fill the collecting lever 7 until the predetermined number of cut lengths 2 has been collected and then delivered to the bundling equipment and saw means. In this way, the entire rolling stock is delivered through the finishing line.

It should be understood that the inventive handling device can be used for other bar materials with cut lengths and short length.

Though the present invention was shown and described with references to the preferred embodiments, various modifications thereof will be apparent to those skilled in the art and, therefore, it is not intended that the invention be limited to the disclosed embodiment or details thereof, and departure can be made therefrom within the spirit and scope of the appended claims.

What is claimed is:

1. A device for handling of cut lengths and short lengths of rolled stock to be transported to bundling equipment and saw devices in merchant bar finishing lines, the handling device comprising a common transporter for transporting the cut lengths and the short lengths to the bundling equipment and saw devices; and collecting means for the cut lengths arranged within the common transporter with a possibility to be lowered with respect to the transporter, wherein the collecting means comprises an angular collecting lever pivotable downward and against a transportation direction and having a long leg which is arranged, in a collecting position of the collecting lever, in a plane of the transporter, and a short leg which projects above the long length.

2. A device according to claim 1, wherein the collecting lever includes a swivel bearing provided at a free end of the long leg.

3. A device according to claim 1, wherein the collecting means comprises pivotable slide guides arranged on opposite sides of the collecting lever and forming, in a lowered position of the collecting lever, a transportation path within a transporter section occupied by the collecting lever in the collecting position thereof.

4. A device according to claim 3, wherein the slide guides are formed by short legs of two angular levers arranged on the opposite sides of the collecting lever and long legs of which have, at free ends thereof, swivel bearings, the collecting means further comprising a connection element connecting the two angular levers.

5. A device according to claim 4, further comprising means for pivoting the slide guides downward in a direction opposite to the transporting direction.

6. A device according to claim 1, wherein movements of the collecting lever, the angular levers and the collecting means provided in the conveyor means are coordinated with each other.

7. A device for handling of sorted cut lengths and short lengths of rolled stock to be transported to bundling equipment and saw devices in merchant bar finishing lines, the handling device comprising a common transporter for transporting the cut lengths and the short lengths to the bundling equipment and saw devices; collecting means for the cut lengths and the short lengths, the collecting means including first means arranged upstream of the transporter for collecting the short lengths and second means for collecting the cut lengths and arranged within the transporter; and one of a roller table and a trough located downstream of the transporter for separately receiving the cut lengths and the short lengths, wherein one of the short lengths and the cut lengths are delivered to the one of a roller table an a trough upon a predetermined number of the short legs being collected in the first means and a predetermined number of the cut length being collected in the second means, respectively.

8. A device according to claim 7, wherein the second means is arranged within the transporter with a possibility to be lowered with respect to the transporter.

* * * * *